July 15, 1952  A. B. MOEN  2,603,503
WAGON STEERING MECHANISM
Filed April 29, 1948  4 Sheets-Sheet 1
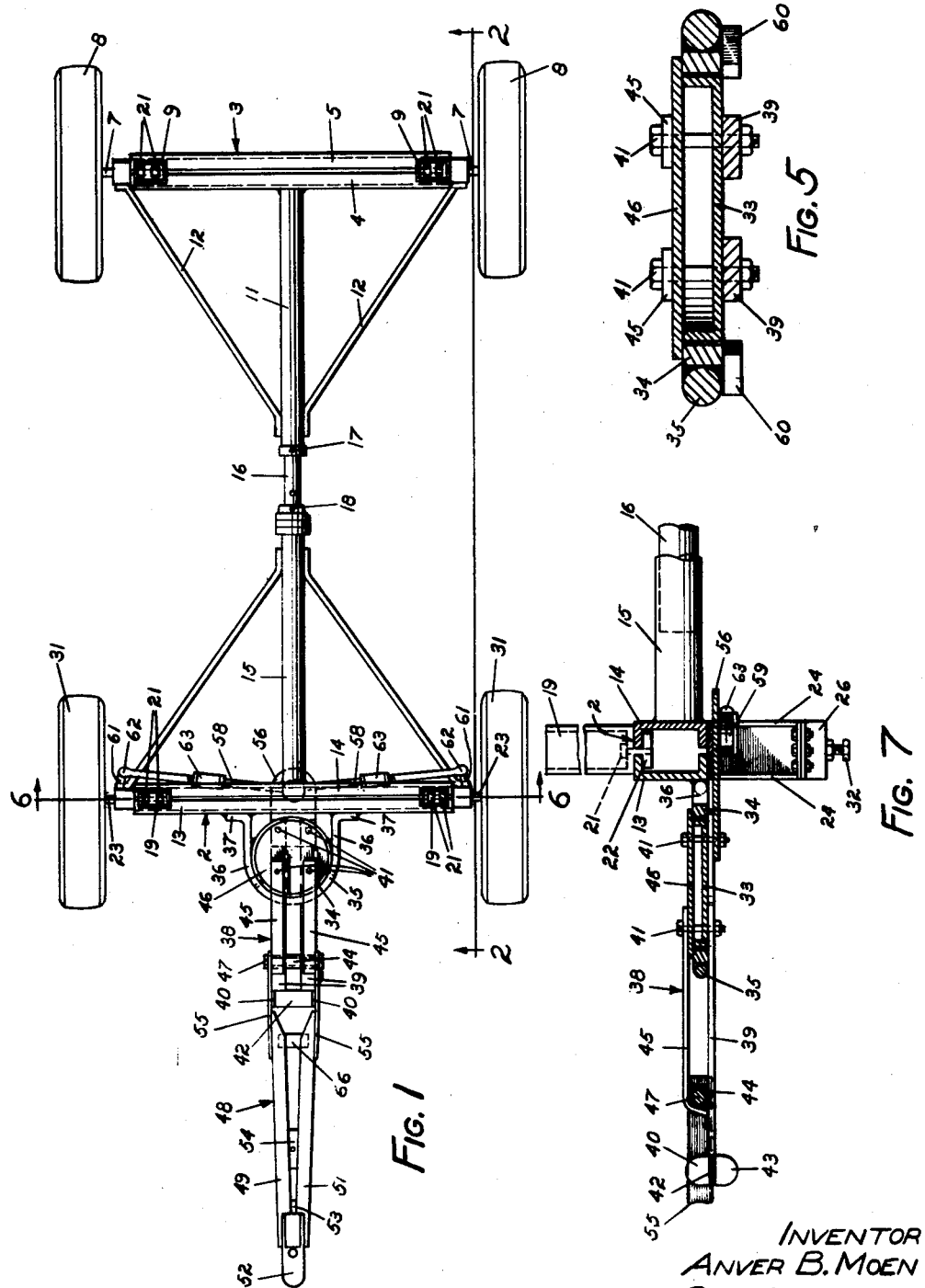
INVENTOR
ANVER B. MOEN
BY Paul, Paul & Moore
ATTORNEYS July 15, 1952  A. B. MOEN  2,603,503
WAGON STEERING MECHANISM
Filed April 29, 1948  4 Sheets-Sheet 2
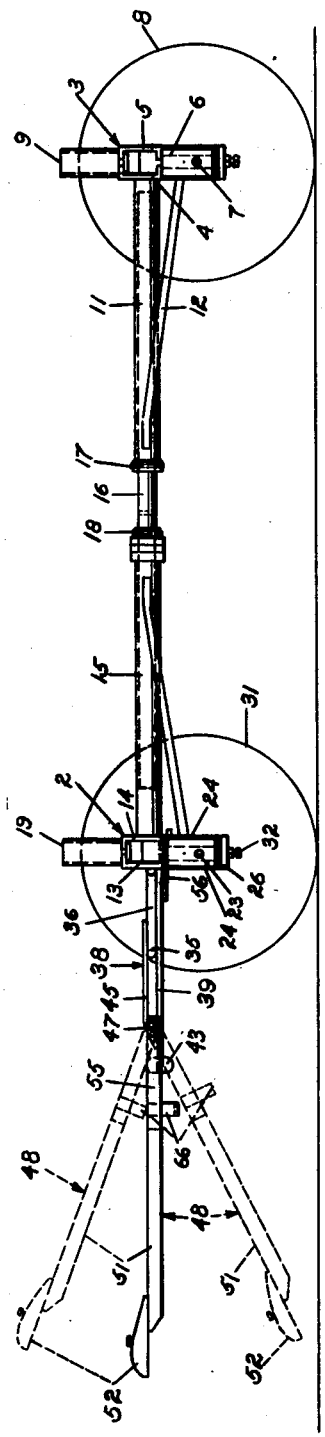
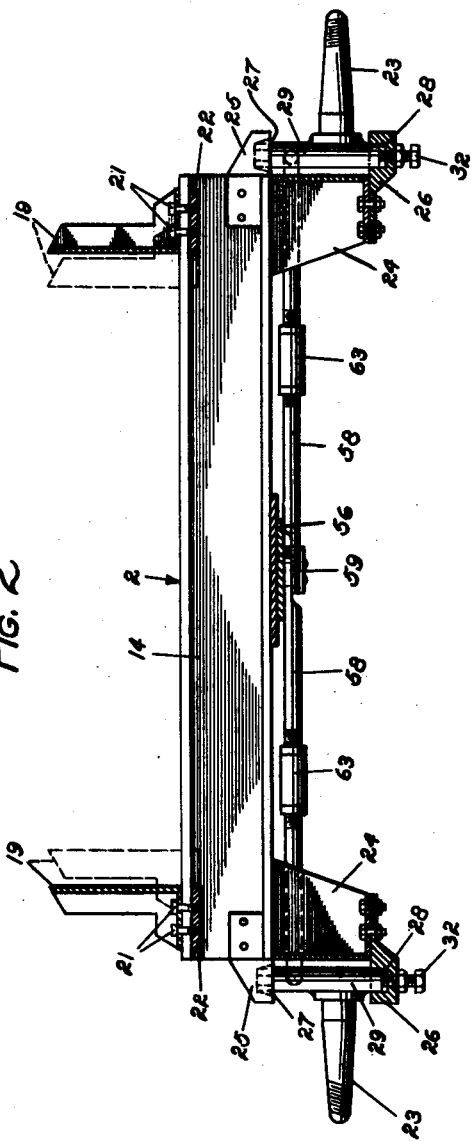
INVENTOR
ANVER B. MOEN
BY Paul, Paul & Moore
ATTORNEYS

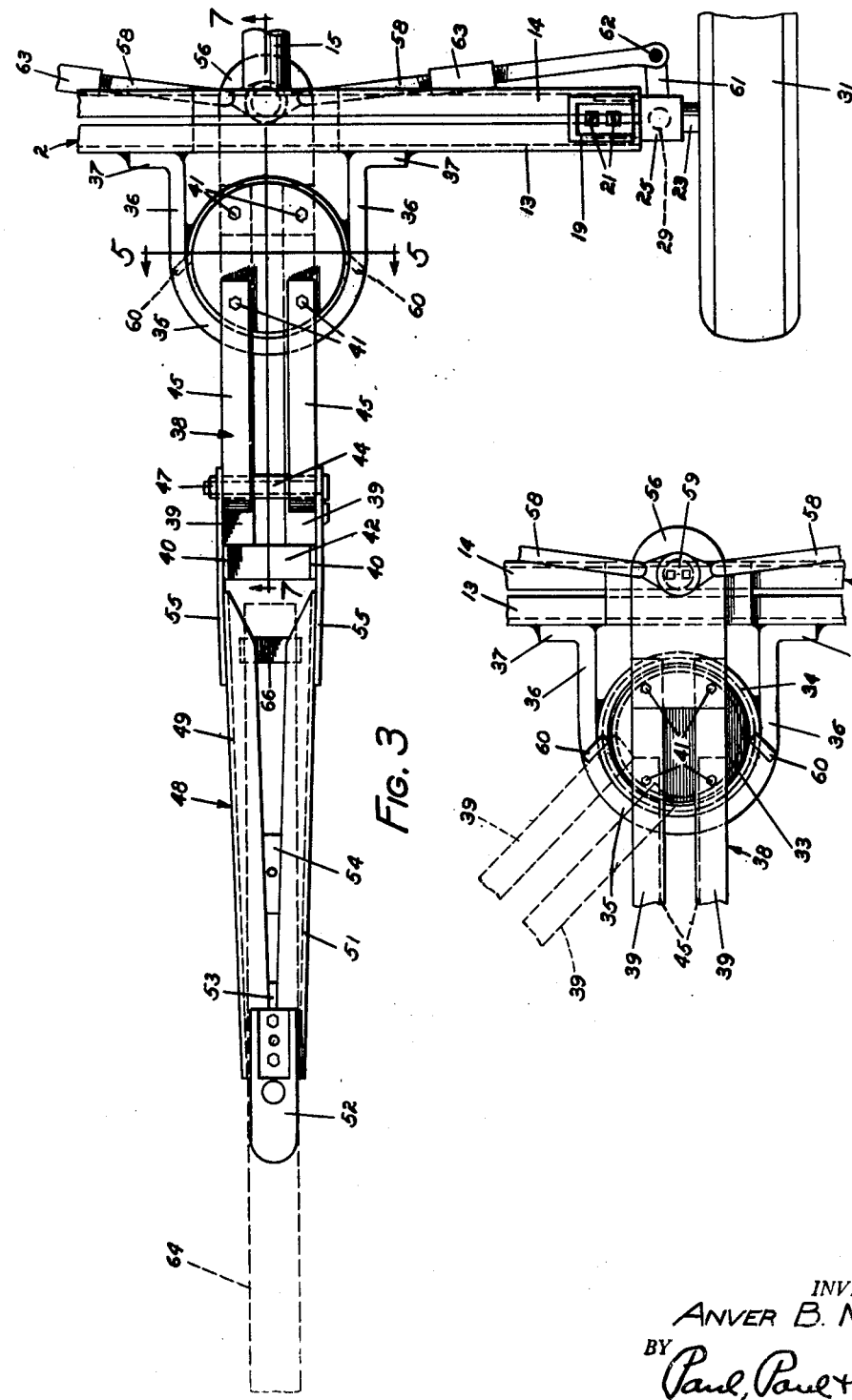

July 15, 1952          A. B. MOEN          2,603,503
WAGON STEERING MECHANISM
Filed April 29, 1948          4 Sheets-Sheet 4
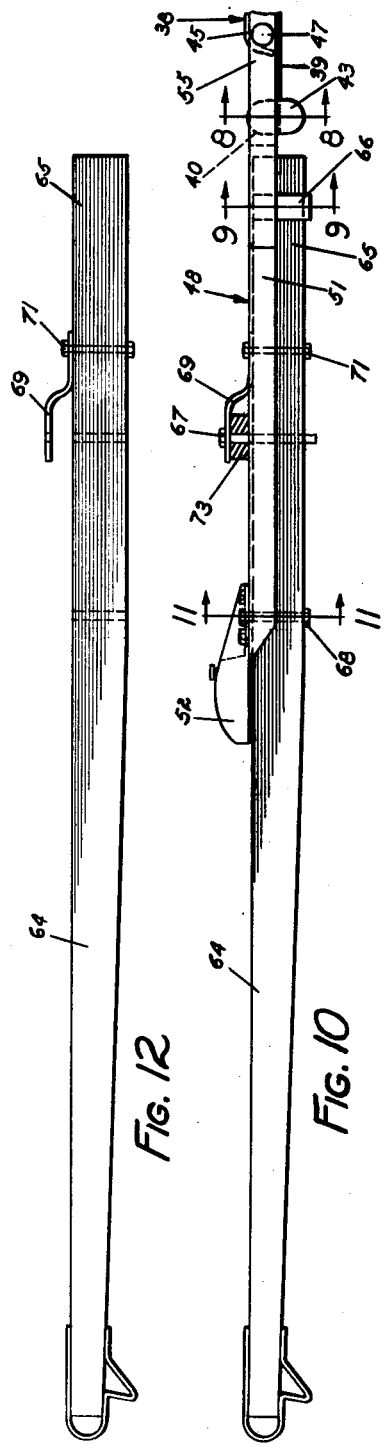
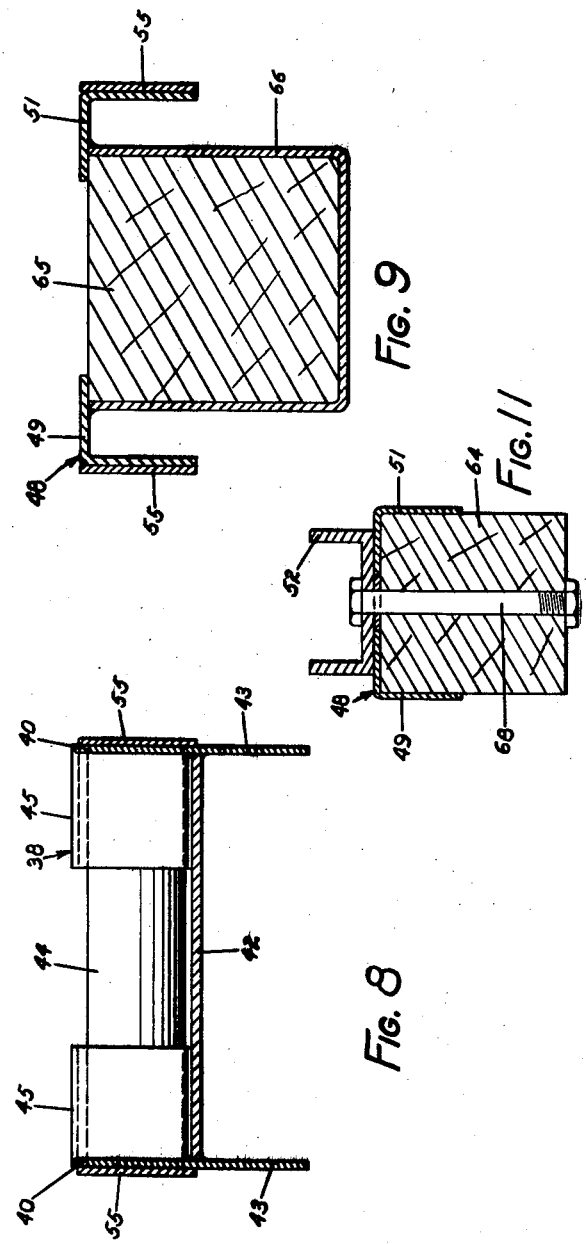
INVENTOR.
ANVER B. MOEN
BY Paul, Paul & Moore
ATTORNEYS Patented July 15, 1952

2,603,503

UNITED STATES PATENT OFFICE 2,603,503

WAGON STEERING MECHANISM

Anver B. Moen, St. James, Minn.

Application April 29, 1948, Serial No. 23,994

5 Claims. (Cl. 280—33.55)

This invention relates to new and useful improvements in wagons and more particularly to wagons particularly adapted for farm use, although they may find numerous other uses.

There are now on the market numerous wagons of the so-called all metal type in which the running gear is constructed of metal and the wheels are equipped with pneumatic tires. Wheels of this type are usually quite small so that the load carrying body of the vehicle is positioned close to the ground to facilitate loading.

One of the important features of the present invention resides in the unique construction of the front axle assembly and the manner of pivotally connecting the draft member thereto, whereby the draft member is connected to the front axle assembly in a manner to reduce to a minimum excess play between the parts thereof, which is a highly desirable feature in structures of this general type.

An object of the present invention, therefore, is to provide a wagon comprising a front axle assembly comprising a pair of channel members having their flanges facing inwardly whereby said channels cooperate to provide a bolster of rectangular cross section, and a swivel plate of comparatively large diameter being secured to said bolster forwardly thereof, said swivel plate being rotatably mounted in a circular supporting frame and having a pair of spaced parallel bars secured to its bottom side and extending forwardly and having a tubular bearing element secured thereto transversely thereof to which a suitable draft member may be connected, and said spaced parallel bars having a plate secured thereto and extending rearwardly from the swivel plate and having connections with the front wheels whereby when the swivel plate is relatively rotated, a steering movement is imparted to the front wheels of the vehicle.

A further object of the invention resides in the construction of the front and rear bolster assemblies of the wagon whereby the usual bolster stakes are adjustably secured to their respective bolsters, thereby to accommodate load carrying bodies of different widths, said bolster stakes also being readily detachable from the bolsters, if desired.

Other objects of the invention reside in the novel construction of the auxiliary tongue whereby the wagon may be quickly converted into a horse-drawn vehicle; in the means provided for coupling the auxiliary tongue to the draft member of the wagon; in the construction of the draft member which is pivotally connected to the swivel plate mounted forwardly of the front axle assembly and whereby the wagon may be readily and quickly coupled to a conventional trailer hitch, as will be understood; in the novel construction of the front axle assembly and particularly the means for mounting the usual front wheel spindles thereon, whereby they are adapted for free pivotal movement to impart turning movement to the front wheels of the wagon; in the specific construction and mounting of the swivel plate, and the means secured thereto for supporting the draw bar or draft member; and in the simple and inexpensive construction of the running gear of the wagon whereby the entire wagon may be manufactured in quantity production at low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a plan view of the novel wagon herein disclosed;

Figure 2 is a longitudinal sectional view on the line 2—2 of Figure 1;

Figure 3 is an enlarged plan view of a portion of the front axle assembly, showing the operative connections between the swivel plate and the front wheels;

Figure 4 is a bottom view of the central portion of the front axle assembly to more clearly illustrate the connections between the swivel plate and the front wheels;

Figure 5 is an enlarged cross sectional view on the line 5—5 of Figure 3;

Figure 6 is a cross sectional view on the line 6—6 of Figure 1, to more clearly illustrate the construction of the front axle assembly;

Figure 7 is a detail sectional view on the line 7—7 of Figure 3;

Figure 8 is an enlarged cross sectional view on the line 8—8 of Figure 10;

Figure 9 is an enlarged cross sectional view on the line 9—9 of Figure 10;

Figure 10 is a view showing the tongue coupled to the draft member of the wagon;

Figure 11 is an enlarged cross sectional view on the line 11—11 of Figure 10;

Figure 12 is a view showing the tongue detached from the draft member.

The novel wagon herein disclosed is shown comprising front and rear axle assemblies, generally designated by the numerals 2 and 3. The rear axle is shown comprising opposed channel members 4 and 5 secured together in slightly spaced relation and having depending brackets 6 secured to the ends thereof to which suitable spindles 7 are secured for supporting the usual rear wheels 8.

An important feature of the present invention resides in the construction of the bolster stakes 9, whereby they are adjustably mounted upon the rear axle to adapt the wagon for load carrying bodies of different widths. The specific construction of the means for adjustably securing the bolster stakes to the bolster will be subsequently described.

A tubular reach member 11 has one end suitably secured to the front channel member 4 of the rear axle 3 by such means as welding, and diagonal brace members 12 are secured to the opposed ends of the rear axle and have their forward ends suitably secured to the tubular member 11, preferably by welding.

The front axle assembly 2 is shown constructed of opposed channel members 13 and 14 in a manner similar to the rear axle 3. A tubular reach member 15 has its front end welded to the rear of channel 14 of the front axle 2 and extends rearwardly therefrom, as best shown in Figures 1 and 2. The reach members 11 and 15 telescopingly receive a coupling member 16 which provides an adjustable connection between the reach members 11 and 15. Pins 17 and 18 operatively connect together the reach sections 11 and 15, as will be understood by reference to Figure 1, and whereby the spacing between the front and rear axles lengthwise of the wagon may be varied to adapt the running gear to load carrying bodies of various lengths.

The front bolster 2 is shown provided with bolster stakes 19 similar to the rear bolster stakes 9. The bolster stakes are preferably formed of channel iron, and also have channel-shaped bottoms or bases slidably seated upon the tops of their respective bolsters, as best shown in Figures 2 and 6. Suitable bolts or cap screws 21 are received in apertures provided in the base portions of the bolster stakes and have their lower threaded terminals received in threaded engagement with clamping plates 22, whereby the bolster stakes may readily be secured in adjusted position by limited rotary movement of the clamping screws 21. The bolsters are so constructed that the bolster stakes 9 and 19 may readily be completely detached from the bolsters by simply loosening the clamping bolts or screws 21 and sliding the bolsters outwardly out of engagement with the opposed channels constituting each axle.

Another important feature of the present invention resides in the novel means provided for pivotally mounting the front wheel spindles 23 on the front axle 2. As best shown in Figure 6, brackets 24 are secured to the bottom of the front axle or bolster by such means as welding. Opposed brackets 25 and 26 are secured respectively to the channels constituting the front bolster and the brackets 24, and are provided with bearing sockets 27 and 28 for receiving the upright members 29 to which the spindles 23 are secured.

Suitable anti-friction bearings are preferably provided in the sockets 27 to reduce friction to turning movement of the front wheels. The front wheels 31 are mounted on the spindles 23 in the usual manner. Suitable adjusting screws 32 are shown provided in the brackets 26 for taking up any play in the spindle supporting elements 29, as will be understood.

Another important feature of the present invention resides in the construction of the front wheel steering mechanism which, as best illustrated in Figures 3, 4, 5 and 7, comprises a swivel plate 33 shown rotatably supported in a circular frame 34 secured to a semi-circular frame 35. The frame 35 is provided with rearwardly extending spaced legs 36 having terminal feet 37 adapted to be seated against the front channel 13 of the front axle assembly and suitably secured thereto as by welding, as will be understood by reference to Figures 3 and 4.

A coupling member, generally designated by the numeral 38, is secured to the swivel plate 33, and is shown comprising a pair of spaced parallel bars 39 shown having their rear end portions secured to the swivel plate 33 by suitable bolts 41. The bars 39 extend forwardly and have their front terminals connected together by a transverse member 42 shown provided with upwardly and downwardly directed bearing lugs 40 and 43, as best shown in Figure 7. A tubular bearing element 44 is secured to the bars 39 by such means as welding, and the front ends of a pair of bars 45 are also suitably secured to the bearing element 44, as will be noted by reference to Figures 3 and 7. The front ends of the bars 45 are welded to the tubular bearing element 44, and their rear ends are secured to a circular plate 46 by the bolts 41, as best illustrated in Figures 3 and 7.

By reference to Figure 7 it will be noted that the plate 46 is relatively larger in diameter than the swivel plate 33, whereby its marginal edge portion may be seated upon circular frame 34 so that it may cooperate with the lower bars 39 to retain the swivel plate 33 in position within the circular frame 34. The tubular bearing member 44 is disposed transversely of the coupling member 38 and is adapted to receive a pivot bolt 47 for coupling the usual draft member, generally designated by the numeral 48, to the coupling member 38.

The draft member 48 is shown comprising opposed angle irons 49 and 51 secured together at their front ends by a suitable trailer hitch 52 of conventional construction, and by suitable tie bars or plates 53 and 54, best shown in Figure 3. The bars or plates 53 and 54 are preferably welded to the angle irons 49 and 51.

Metallic straps 55 are suitably secured to the rear ends of the angle irons 49 and 51 of the draft member 48, and have apertures at their rear ends for receiving the pivot bolt 47, thereby to pivotally couple the draft member 48 to the coupling member 38. The transverse spacing between the opposed guide lugs 43 at the outer end of the coupling member 38 is such as to engage the bars 55 of the draft member 48 to thereby prevent lateral play of the draft member with respect to the coupling member 38 upon turning movement of the vehicle. The lugs 40 cooperate with the lugs 43 to support the draft member 48.

To effect turning movement of the front wheels, a member 56 is secured to the swivel plate 33 by such means as the rear bolts 41 shown in Figures 4 and 7. Tie bars 58 have their inner ends pivotally connected to the member 56, as shown at 59, and the outer ends of the tie bars 58 are pivotally connected to spindle arms 61, as indicated at 62 in Figures 1 and 3, whereby when the member 56 is rotated about the axis of the swivel plate 33 by swinging movement of the draft member 48, turning movement is imparted to the front wheels 31 about the axes of the cylindrical members 29 to which the spindles 23 are secured.

Suitable turn buckles 63 are shown provided in each tie bar 58 to facilitate properly aligning the front wheels with the rear wheels. Stop lugs 60 are also shown provided upon the bottom of the supporting frame 35 of the swivel plate 33 adapted to be engaged by the bars 39 of the coupling member 38, as indicated in dotted lines in Figure 4, thereby limiting turning movement of the front wheels.

Another important feature of the present invention resides in the construction of the draft member 48, whereby a conventional wagon tongue 64, shown in Figure 12, may readily be secured to the wagon to adapt it for propulsion by a team of horses.

The wagon tongue 64 may be constructed of timber or any other suitable material, and its rear end portion 65 is preferably square in cross section, as shown in Figure 9. A stirrup 66 is secured to the opposed angle bars 49 and 51 of the draft member and is adapted to receive the end portion 65 of the wagon tongue 64, as clearly illustrated in Figure 9.

To secure the tongue 64 to the draft member 48, the rear end portion 65 of the tongue is inserted into the stirrup 66, and the tongue and angle irons 49 and 51 of the draft member 48 are then brought into engagement with one another, as shown in Figure 10, after which a suitable bolt 68 is inserted through aligned openings in the tongue and trailer hitch 52, as shown in Figure 10, whereby the tongue is secured to the draft member to become, in effect, a component part thereof. A strap member 69 is shown secured to the tongue by a bolt 71 and has an aperture at its forward end adapted to receive a bolt or pin 67 which also traverses an opening in the plate element 54 of the draft member 38. The strap member 69 serves as a means for securing a device such as a conventional evener 73 to the tongue.

From the foregoing it will be noted that the wagon herein disclosed may readily be coupled to a tractor or a truck provided with a complemental trailer hitch part, or, if desired, the tongue 64 may be coupled to the draft member 48 to convert the vehicle for propulsion by a team of horses.

The front axle construction provides a very rigid structure, and the unique mounting for the spindles 23 is such that there is little danger of the parts becoming loose in their joints, as is more or less common in wagons of this general type now in use. The swivel plate 33 is made comparatively large in diameter to provide ample rigidity and stability and whereby play in the joints of the steering mechanism is unlikely to occur. The coupling member 38 firmly secures the swivel plate in position in its circular supporting frame 35, and the elongated tubular bearing element 44 provides a substantial and rugged adequate support for coupling the draft member 48 to the coupling member 38.

The adjustability of the bolster stakes is also highly desirable in that it makes it possible to quickly adjust the spacing between the bolster stakes to adapt the wagon for load carrying bodies of varying widths. The connections between the telescopic members 11, 15 and 16 also make it possible to readily vary the spacing between the front and rear wheels. Means, not shown, is also provided for permitting limited relative rotary movement between the reach members 11 and 15 to prevent such members from being subjected to excessive strains, should one of the wheels pass over an obstruction which would raise or lower it from its normal line of travel.

It will also be noted that the spindle supporting elements 29 of the front wheels are made comparatively long in a vertical direction, and their upper ends are preferably supported in suitable roller bearings to reduce friction. Also, by provision of the brackets 24, greater road clearance is provided beneath the front and rear axles.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a wagon of the class described, a front bolster having front wheel spindles mounted at the ends thereof and adapted for pivotal movement about vertical axes to effect turning movement of the vehicle, front wheels mounted on said spindles, a circular frame secured to the front bolster and disposed forwardly thereof, a swivel plate rotatably mounted in said frame and having means overlying said frame, a coupling member secured to the bottom side of the swivel plate and having a portion extending rearwardly to a position beneath the front bolster and cooperating with the overlying portion of the swivel plate to retain said plate in the circular frame, connecting rods each having one end connected to the rear end of said coupling member and having their other ends connected to the front wheel spindles, thereby to impart turning movement to the wagon front wheels, when the coupling member is laterally swung from one side to another.

2. In a wagon of the class described, a front bolster, a comparatively large circular frame secured to the bolster and projecting forwardly thereof, a swivel plate rotatably mounted in said frame and having means engaging the upper face thereof, an elongated coupling member secured to the bottom of the swivel plate and extending rearwardly therefrom and cooperating with said means to rotatably retain the swivel plate in the circular frame, connecting means between the rear end of the coupling member and the front wheels of the axle whereby turning movement is imparted to the carrying wheels when the swivel plate is relatively rotated in its supporting frame, and complemental bars secured to the swivel plate and extending forwardly therefrom and having means at their forward ends for detachably connecting a draft member thereto to facilitate coupling the wagon to a propelling vehicle.

3. In a wagon of the class described, front and rear wheels, a front bolster, an enlarged circular frame secured to said bolster and projecting forwardly thereof, a swivel plate rotatably mounted in said frame, a complemental plate secured to the swivel plate and overlying a portion of the circular frame, an elongated member secured to the bottom of the swivel plate and cooperating with said complemental plate to retain the swivel plate in position in the circular frame, said elongated member extending rearwardly from the swivel plate, and means for operatively connecting said elongated member with the front wheels of the wagon whereby turning movement is imparted to said front wheels when the swivel plate is relatively rotated in its supporting frame.

4. In a wagon of the class described, a front bolster, a comparatively large circular frame secured to said bolster and projecting forwardly thereof, a swivel plate rotatably mounted in said frame, a complemental plate secured to the swivel plate and overlying a portion of the circular frame, an elongated member secured to the bottom of the swivel plate and cooperating with said complemental plate to retain the swivel plate in position in said circular frame, said elongated member extending rearwardly from the swivel plate and having means for connecting it to the front wheels of the axle whereby turning movement is imparted to said front wheels when the swivel plate is relatively rotated in its supporting frame, and a coupling member secured to the swivel plate and extending forwardly therefrom and having means at its forward end for detachably connecting a draft member thereto to facilitate coupling the wagon to a power vehicle.

5. In a wagon of the class described, a front bolster, a comparatively large circular frame secured to said bolster and projecting forwardly thereof, a swivel plate rotatably mounted in said frame, a complemental plate secured to the swivel plate and overlying a portion of the circular frame, an elongated member secured to the bottom of the swivel plate and cooperating with said complemental plate to retain the swivel plate in position in said circular frame, said elongated member extending rearwardly from the swivel plate, means for operatively connecting said elongated member with the front wheels of the wagon whereby turning movement is imparted to the front wheels when the swivel plate is relatively rotated in its supporting frame, a coupling member secured to the swivel plate, a draft member detachably connected to the coupling member, and means in the draft member whereby a conventional wagon tongue may be attached thereto to convert the apparatus for animal propulsion.

ANVER B. MOEN.

REFERENCES CITED

The following references are of record in the file of this patent:

UNITED STATES PATENTS

| Number | Name | Date |
|---|---|---|
| 534,386 | Bettermann | Feb. 19, 1895 |
| 682,080 | Hudson | Sept. 3, 1901 |
| 1,390,852 | Woolley | Sept. 13, 1921 |
| 1,812,768 | Berggren | June 30, 1931 |
| 2,008,747 | Croft | July 23, 1935 |
| 2,047,206 | Knapp | July 14, 1936 |
| 2,059,419 | Tuft | Nov. 3, 1936 |
| 2,106,923 | Tuft | Feb. 1, 1938 |
| 2,190,300 | Van Zeeland et al. | Feb. 13, 1940 |
| 2,284,892 | Persinske | June 2, 1942 |